United States Patent
Watson (10) Patent No.: US 7,844,096 B2
(45) Date of Patent: Nov. 30, 2010

(54) SPATIALLY LOCALIZED NOISE ADAPTIVE SMOOTHING OF EMISSION TOMOGRAPHY IMAGES

(75) Inventor: Charles C Watson, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 983 days.

(21) Appl. No.: 11/656,205

(22) Filed: Jan. 22, 2007

(65) Prior Publication Data
US 2008/0175457 A1    Jul. 24, 2008

(51) Int. Cl.
*G06K 9/00* (2006.01)
*G06K 9/40* (2006.01)

(52) U.S. Cl. ........................ 382/131; 382/261
(58) Field of Classification Search ............... 382/131, 382/261
See application file for complete search history.

(56) References Cited
U.S. PATENT DOCUMENTS

| | | | | |
|---|---|---|---|---|
| 5,653,234 A | * | 8/1997 | Kim et al. ............... | 600/437 |
| 5,909,476 A | * | 6/1999 | Cheng et al. ............. | 378/4 |
| 6,529,575 B1 | * | 3/2003 | Hsieh ...................... | 378/4 |
| 7,376,255 B2 | * | 5/2008 | De Man et al. .......... | 382/131 |
| 2005/0025377 A1 | * | 2/2005 | Avinash et al. .......... | 382/260 |
| 2005/0286749 A1 | * | 12/2005 | De Man et al. .......... | 382/131 |

FOREIGN PATENT DOCUMENTS

WO    WO 2006082590 A2 *    8/2006

OTHER PUBLICATIONS

Charles C. Watson ("Count Rate Dependence of Local Signal-to-Noise Ratio in Positron Emission Tomography", Charles C. Watson, IEEE Transactions on Nuclear Science, vol. 51, No. 5, Oct. 2004, pp. 2670-2680).*

* cited by examiner

*Primary Examiner*—Wenpeng Chen
(74) *Attorney, Agent, or Firm*—Peter Kendall (57) ABSTRACT

A method and system for spatially localized, noise-adaptive smoothing of filtered back-projection (FBP) nuclear images includes smoothing a FBP image on a pixel-by-pixel basis using a shift-invariant kernel such as a Gaussian kernel. The width of the kernel may be varied on a pixel basis, such that the smoothed image contains a constant SNR over the entire image.

20 Claims, 5 Drawing Sheets

SPATIALLY LOCALIZED NOISE ADAPTIVE SMOOTHING OF EMISSION TOMOGRAPHY IMAGES

TECHNICAL FIELD

The current invention is in the field of medical imaging. Particularly, the invention relates to techniques for image reconstruction from emission projection data and reduction of statistical fluctuations in the resulting reconstructed tomographic images.

BACKGROUND OF THE INVENTION

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT). Using these or other imaging types and associated machines, an image or series of images may be captured. Other devices may then be used to process the image in some fashion. Finally, a doctor or technician may read the image in order to provide a diagnosis.

A PET camera works by detecting pairs of gamma ray photons in time coincidence. The two photons arise from the annihilation of a positron and electron in the patient's body. The positrons are emitted from a radioactive isotope that has been used to label a biologically important molecule like glucose (a radiopharmaceutical). Hundreds of millions such decays occur per second in a typical clinical scan. Because the two photons arising from each annihilation travel in opposite directions, the rate of detection of such coincident pairs is proportional to the amount of emission activity, and hence glucose, along the line connecting the two detectors. In a PET camera the detectors are typically arranged in rings around the patient. By considering coincidences between all appropriate pairs of these detectors, a set of projection views can be formed each element of which represents a line integral, or sum, of the emission activity in the patient's body along a well defined path. These projections are typically organized into a data structure called a sinogram, which contains a set of plane parallel projections at uniform angular intervals around the patient. A three dimensional image of the radiophamaceutical's distribution in the body can then be reconstructed from these data.

A SPECT camera functions similarly to a PET camera in many ways, but detects only single photons rather than coincident pairs. For this reason, a SPECT camera must use a lead collimator with holes, placed in front of its detector panel, to define the lines of response in its projection views. One or more such detector panel/collimator combinations rotates around a patient, creating a series of planar projections each element of which represents a sum of the emission activity, and hence biological tracer, along the line of response defined by the collimation. As with PET, these data can be organized into sinograms and reconstructed to form an image of the radiopharmaceutical tracer distribution in the body.

The aim of the reconstruction process is to retrieve the spatial distribution of the radiopharmaceutical from the projection data. The main reconstruction step involves a process known as back-projection. In simple back-projection, an individual data sample is back-projected by setting all the image pixels along the line of response pointing to the sample to the same value. In less technical terms, a back-projection is formed by smearing each view back through the image in the direction it was originally acquired. The back-projected image is then taken as the sum of all the back-projected views. Regions where back-projection lines from different angles intersect represent areas which contain a higher concentration of radiopharmaceutical.

While back-projection is conceptually simple, it does not by itself correctly solve the reconstruction problem. A simple back-projected image is very blurry; a single point in the true image is reconstructed as a circular region that decreases in intensity away from the center. In more formal terms, the point spread function of back-projection is circularly symmetric, and decreases as the reciprocal of its radius.

Filtered back-projection (FBP) is a technique to correct the blurring encountered in simple back-projection. Each projection view is filtered before the back-projection step to counteract the blurring point spread function. That is, each of the one-dimensional views is convolved with a one-dimensional filter kernel (e.g. a "ramp" filter) to create a set of filtered views. These filtered views are then back-projected to provide the reconstructed image, a close approximation to the "correct" image.

The inherent randomness of radioactive decay and other processes involved in generating nuclear medical image data results in unavoidable statistical fluctuations (noise) in PET or SPECT data. This is a fundamental problem in clinical imaging that is dealt with through some form of smoothing of the data. In FBP this is usually accomplished by modifying the filter kernel used in the filtering step by applying a low-pass windowing function to it. This results in a spatially uniform, shift-invariant smoothing of the image that reduces noise, but may also degrade the spatial resolution of the image. A disadvantage of this approach is that the amount of smoothing is the same everywhere in the image although the noise is not. Certain regions, e.g. where activity and detected counts are higher, may have relatively less noise and thus require less smoothing than others. Standard windowed FBP cannot adapt to this aspect of the data.

There are several alternatives to FBP for reconstructing nuclear medical data. In fact, most clinical reconstruction of PET images is now based on some variant of regularized maximum likelihood (RML) estimation because of the remarkable effectiveness of such algorithms in reducing image noise compared to FBP. In a sense, RML's effectiveness stems from its ability to produce a statistically weighted localized smoothing of an image. These algorithms have some drawbacks however: they are relatively expensive because they must be computed iteratively; they generally result in poorly characterized, noise dependent, image bias, particularly when regularized by premature stopping (unconverged); and the statistical properties of their image noise are difficult to determine.

There remains a need in the art for improvement in image reconstruction techniques to produce an image with statistically adaptive noise reduction similar to RML, but faster, with less computational complexity and better quantitative accuracy, similar to FBP.

SUMMARY OF THE INVENTION

A new statistically adaptive smoothing algorithm for FBP is provided that equalizes the local relative noise level, or signal-to-noise ratio (SNR), across an image on a pixel-by-pixel basis. This new process is referred to herein as SNR-equalized FBP (SNR-FBP). The localized smoothing produces images with visual qualities much more similar to RML than does conventional windowed FBP. In contrast to RML however, SNR-FBP has well characterized spatial resolution and noise variance at every point in the image at all noise levels. Thus, while SNR-FBP may not have the optimal statistical properties of a true maximum likelihood or maximum a posteriori reconstruction, it may prove valuable for time-constrained reconstructions where accurate quantitation with known precision and resolution is important.

The method for tomographic image reconstruction provided is based on two simple principles. First, the raw data in nuclear medical imaging—detected count rates—are Poisson distributed random variables whose (noise) variance can be accurately estimated. (For a Poisson variable, the variance is equal to the mean.) Second, for a linear reconstruction algorithm, such as FBP, any reconstructed image element can be ultimately represented as a linear combination of the raw data. Therefore, the noise variance in the image element can be computed from a simple propagation of errors from the raw data. This variance can be controlled by adjusting the width of the smoothing kernel used in the reconstruction. As the width increases, the variance decreases. By reconstructing the data using several different smoothing filters and interpolating between the resulting mean and variance images independently in each pixel, a specified relative noise level, or SNR, can be achieved in each image element.

Let $R_\alpha^{ij}$ represent the reconstructed mean image value in a pixel indexed by (i,j), and let $V_\alpha^{ij}$ represent the computed noise variance in that pixel element. $\alpha$ is a parameter indicating the width of the smoothing kernel employed in the reconstruction. The method includes reconstructing $R_\alpha^{ij}$ and $V_\alpha^{ij}$ for several different values of $\alpha$. The method further includes the steps of forming a signal-to-noise ratio (SNR), $SNR_\alpha^{ij}=R_\alpha^{ij}/\sqrt{V_\alpha^{ij}}$, for each $R_\alpha^{ij}$ and $V_\alpha^{ij}$, selecting a target value for the SNR of the output image, and interpolating between the $R_\alpha^{ij}$ values whose corresponding $SNR_\alpha^{ij}$ values bracket the target SNR using a model of the variation of $R_\alpha^{ij}$ with $SNR_\alpha^{ij}$.

A system employing the method of the current invention is also provided. The system includes a nuclear medical imaging device, a processor for receiving data from the image scanner, and software running on the processor. The software is capable of performing the steps of the method of the current invention.

BRIEF DESCRIPTION OF THE DRAWINGS

The invention will now be described in greater detail in the following by way of example only and with reference to the attached drawings, in which.

DETAILED DESCRIPTION OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
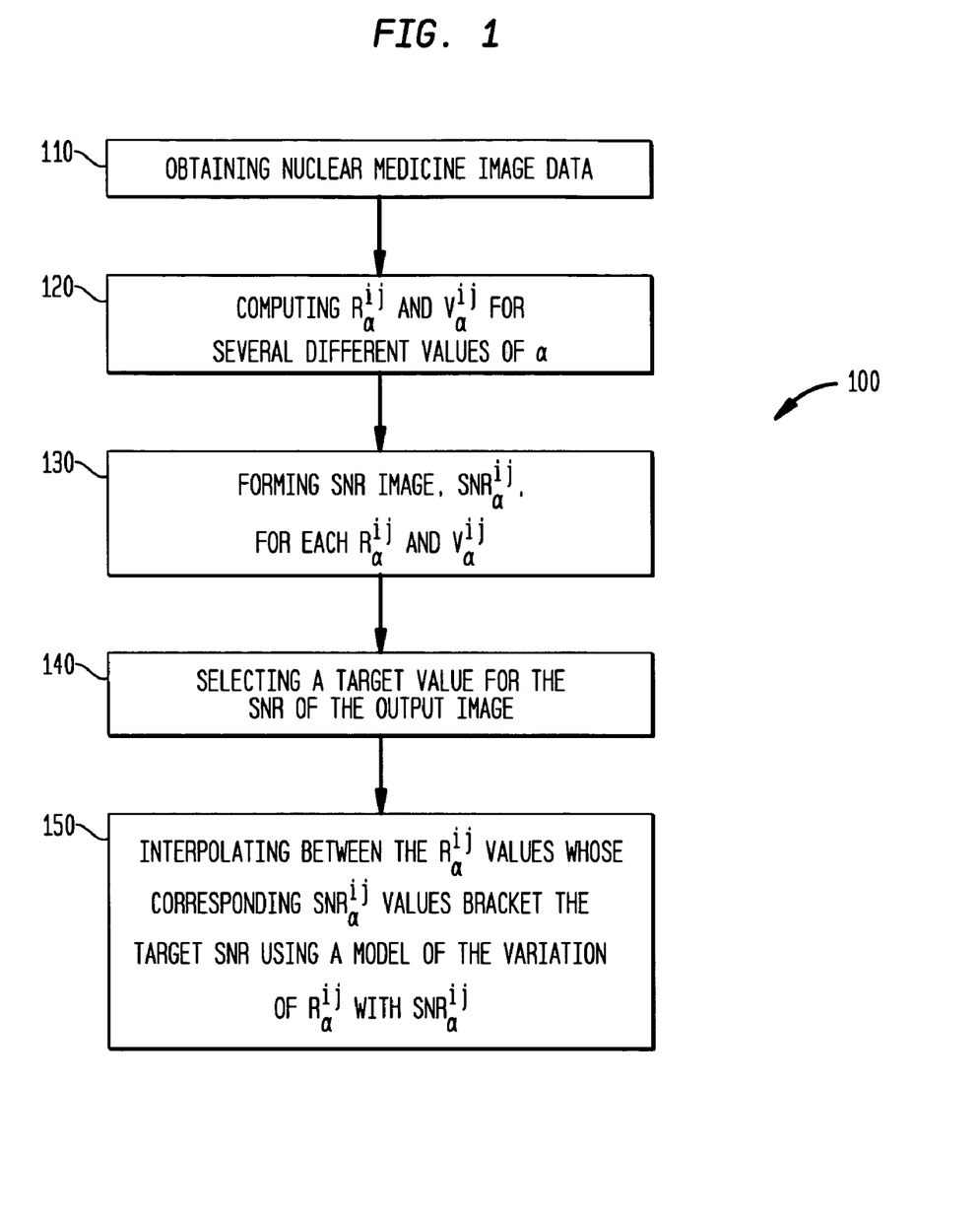
FIG. 1 is a schematic of the method of the current invention.

FIG. 1 is a flow chart of a method 100 according to the present invention. At step 110, nuclear medical image projection data is obtained. The projection data may be from a PET scanner or a SPECT scanner. The PET data may optionally include time-of-flight (TOF) information. At step 120 the projection data are processed using a standard linear reconstruction algorithm to produce an image of the estimated mean value of the radiopharmaceutical concentration, $R_\alpha^{ij}$, or related quantity. For SPECT or non-TOF PET, the algorithm may be FBP. For TOF PET, the algorithm may be confidence-weighted filtered back-projection or another similar algorithm known to those skilled in the art. In either case, the reconstruction process incorporates a shift-invariant smoothing kernel of variable width, $\alpha$. A typical function form for such a kernel would be a Gaussian, but many other forms are possible. The reconstruction is repeated for several different values of $\alpha$. Also at step 120 the noise variance image, $V_\alpha^{ij}$, corresponding to each smoothing kernel width is computed.

The mean image value at pixel (i, j), $R_\alpha^{ij}$, depends on the width, $\alpha$, of the kernel. For FBP this image value can be expressed in terms of the measured projection data according to:

$$R_\alpha^{ij} = \sum_{lm} h_\alpha(l - i\cos\theta_m + j\sin\theta_m) a_{lm} n_{lm} (p_{lm} - d_{lm} - s_{lm}),$$

where l and m are respectively the radial and angular sinogram bin indices, $\theta_m$ is the projection angle, $\alpha$ and n are respectively the attenuation correction and normalization factors, and p, d and s are the prompt, randoms, and scattered coincidence data respectively. $h_\alpha(l)$ is the discrete filtering kernel given by the convolution:

$$h_\alpha(l) = \sum_k C_k^l g_\alpha(k),$$

where $C_k^l$ is the standard FBP kernel corresponding to a ramp filter, k is a radial bin index, and $g_\alpha$ is the smoothing kernel. For a Gaussian smoothing kernel:

$$g_\alpha(k) = \frac{1}{\sqrt{2\pi}\,\sigma} \exp\left(-\frac{k^2}{2\sigma^2}\right),$$

whose spatial full width at half maximum (FWHM) is $\alpha = \sqrt{2\sigma^2(4\ln 2)}$.

Assuming that the prompt data are uncorrelated and Poisson distributed, and that a noise-free estimate of the scatter rate is available, an image of the variance of $R_\alpha^{ij}$, $V_\alpha^{ij}$, may be computed according to:

$$V_\alpha^{ij} = \sum_{lm} h_\alpha^2 (l - i\cos\theta_m + j\sin\theta_m) a_{lm}^2 n_{lm}^2 (p_{lm} + [d_{lm}]).$$

The term $d_{lm}$ may be required for delayed coincidence subtraction, but may be deleted if a noise free estimate of the randoms is used. $V_\alpha^{ij}$ is not the same as a pixel-to-pixel variance over $R_\alpha^{ij}$ in the original image, but may be an estimate of the ensemble variance of the value of $R_\alpha^{ij}$.

Given the mean and variance images, an SNR image may be formed from their ratio:

$$SNR_\alpha^{ij} = \frac{R_\alpha^{ij}}{\sqrt{V_\alpha^{ij}}}.$$

For a given (fixed) kernel width, $SNR_\alpha^{ij}$ may be higher in those regions of the image with higher emission activity, such as hot spots. For a given pixel, $SNR_\alpha^{ij}$ tends to increase monotonically as the width $\alpha$ of the kernel increases. If a particular value of SNR is specified, e.g. SNR=5, it may be possible to achieve this value in any pixel by appropriately adjusting $\alpha$. An image may then be formed, each pixel of which is drawn from the particular $R_\alpha^{ij}$ that achieves the specified SNR at that point.

There then may be an SNR-equalized image with constant SNR but varying $\alpha$, ($\alpha_{ij}$). The smoothing kernel needed to achieve this SNR-FBP image may be narrower in higher intensity regions and broader in low intensity, noisier regions resulting in statistically adaptive smoothing. Because $SNR_\alpha$ tends to vary smoothly with $\alpha$, the SNR-FBP image can be computed by reconstructing $R_\alpha^{ij}$ and $V_\alpha^{ij}$ at a few values of $\alpha$ (step 120), forming an SNR image $SNR_\alpha^{ij}$ for each $R_\alpha^{ij}$ and $V_\alpha^{ij}$ (step 130), selecting a target SNR value for the output image (step 140), and interpolating between the calculated $R_\alpha^{ij}$ a image values at step 150.

Each pixel may be interpolated between the $R_\alpha^{ij}$ values whose corresponding $SNR_\alpha^{ij}$ values bracket the target SNR using a model, which may be linear, of the variation of $R_\alpha^{ij}$ with $SNR_\alpha^{ij}$. The kernel widths can also be interpolated to give the effective FWHM resolution at each point, $\alpha_{ij}$. The overall smoothness level in the image is controlled by the SNR value, with higher values giving smoother images. In a first embodiment, using the interpolated values, a SNR-equalized image $R_{eq}^{ij}$ may be formed.

It is possible that the target SNR may not be achievable at some point within the image for any reasonable value of $\alpha_{ij}$. To deal with such cases, the permitted values of $\alpha_{ij}$ may be constrained to lie within certain limits, and the value giving an $SNR_\alpha^{ij}$ closest to the desired target value used, thus determining $R_\alpha^{ij}$ at that point.

The technique is not limited to conventional FBP but could be applied to any reconstruction algorithm for which the $R_\alpha^{ij}$ and $V_\alpha^{ij}$ images can be readily computed. This capability has been demonstrated for linear time-of-flight (TOF) reconstruction of PET, and thus the methodology for producing an SNR-equalized image can be equally well applied in this case.

In a second embodiment, an image based on any metric that is a function of $R_\alpha^{ij}$ and $V_\alpha^{ij}$ may be formed. For example, the selected value of SNR may be treated as a threshold. The image may be smoothed using a default value of $\alpha$, but for those pixels for which $SNR_\alpha^{ij}$ was less than the desired minimum value, $\alpha_{ij}$ would be increased until the threshold SNR value was met.

As a second example, $\alpha_{ij}$ could be chosen at each point so that $SNR_\alpha^{ij}$ was increased by a constant factor. Statistical functions other than SNR may also be used.

In a third embodiment, the statistical information provided by the method may be examined directly. For instance the variance or SNR images can be examined at different resolutions that are computed during the generation of the SNR-FBP image.

Figure 2:
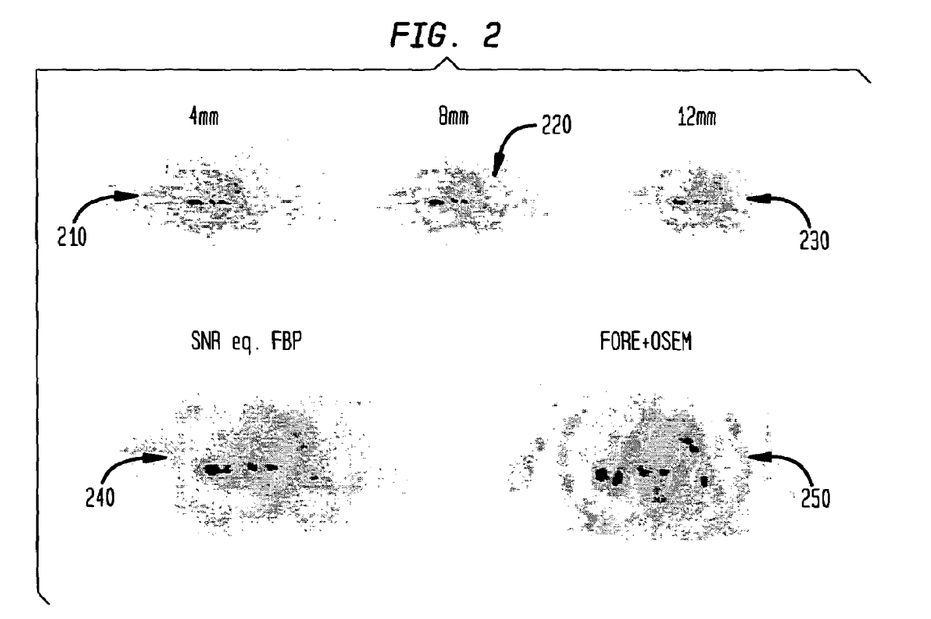
FIGS. 2 and 3 depict PET image slices from two patients using different reconstruction and filtering techniques.
Figure 3:
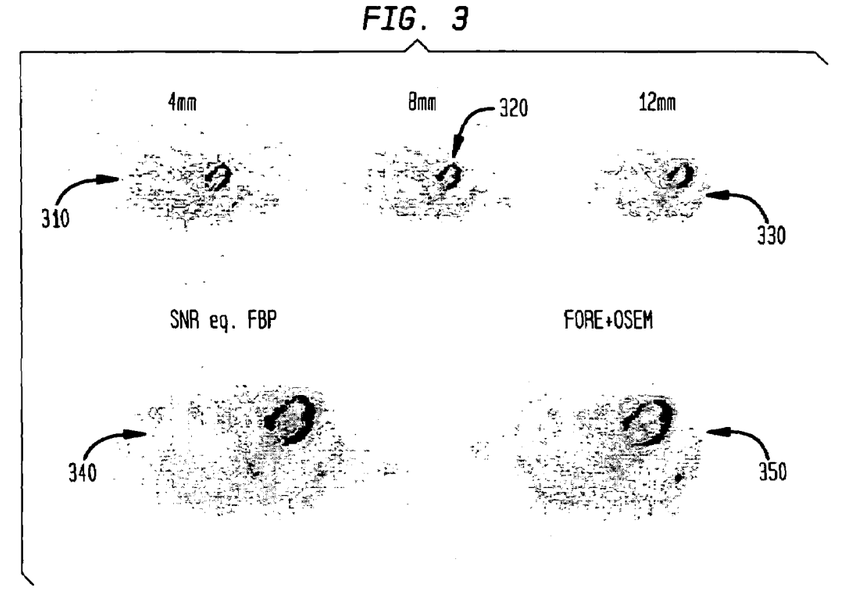

FIGS. 2 and 3 show results from two image slices of a PET patient study. The reconstruction was non-TOF FBP. In each figure, the top row of images 210, 220, 230, and 310, 320, and 330 show standard FBP post-smoothed with Gaussian kernels of different widths, illustrating typical conventional clinical image processing. The images on the bottom left 240 and 340 are the SNR-equalized FBP image, with SNR=5. For comparison, a standard clinical RML iteratively reconstructed image 250, 350 is shown on the lower right.

Figure 4:
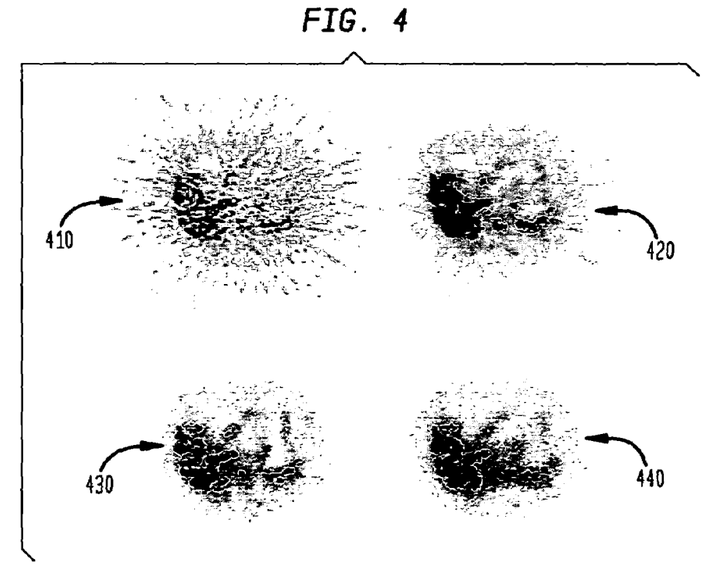
FIG. 4 depicts TOF-PET image slices reconstructed using either conventional filtering or SNR equalization.

FIG. 4 is an example of SNR equalization in linear, confidence-weighted TOF-PET reconstruction. The images in the top row 410 and 420 are conventional TOF reconstruction with post-smoothing by a Gaussian kernel of 8 or 16 mm respectively. The bottom row shows SNR-equalized reconstructions at two values of target SNR, SNR=6 (430) and SNR=9 (440).

Figure 5:
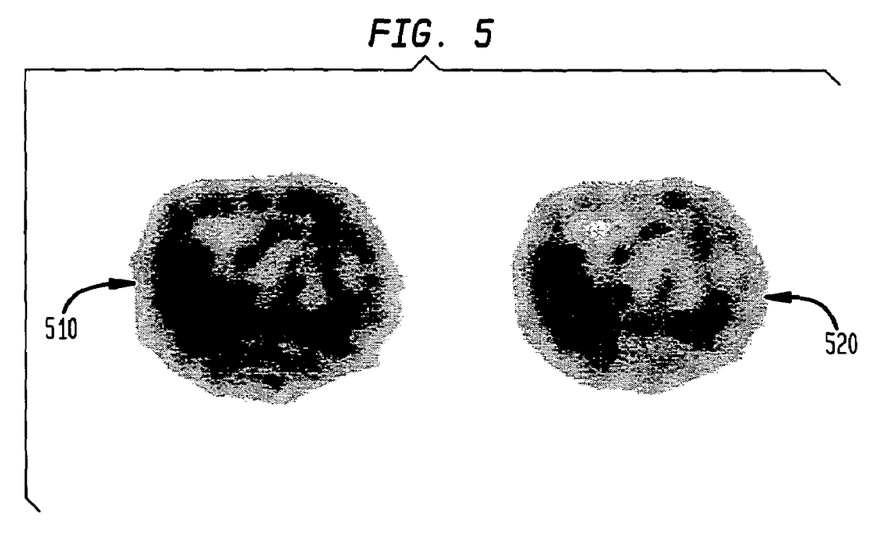
FIG. 5 depicts image slices of the FWHMs used for the SNR-FBP images of FIG. 4.

FIG. 5 shows images of the FWHMs $\alpha_{ij}$ used to produce the SNR-equalized images of FIG. 4. The range used is from 4 to 60 mm with 60 mm corresponding to white.

Figure 6:
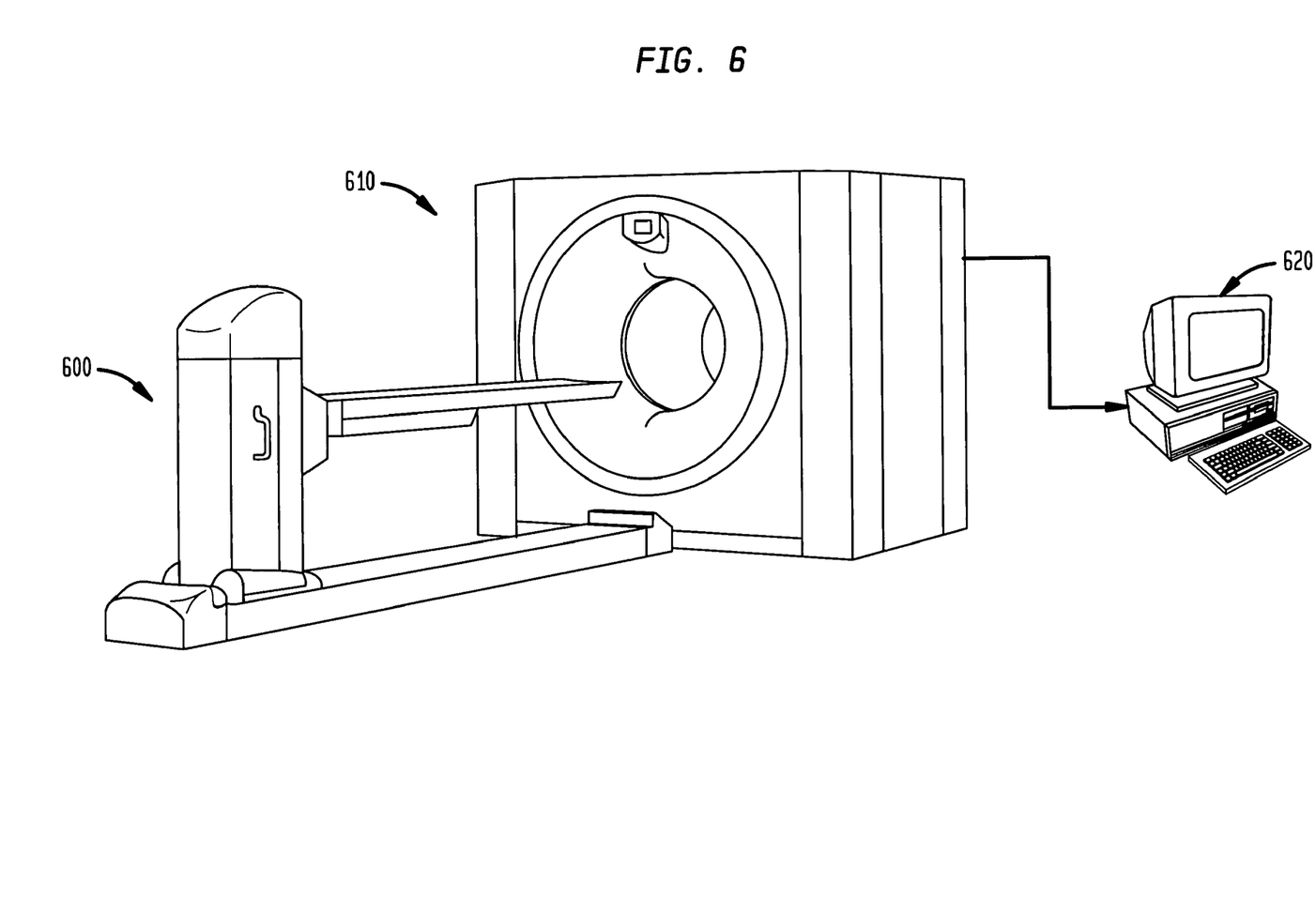
FIG. 6 is a diagram of a system according to a possible embodiment of the current invention.

FIG. 6 is a diagram of a system 600 using the method 100 of the present invention. The system includes a medical imaging device 610, i.e. a PET scanner or a SPECT scanner. The medical imaging device 610 may be connected to a processor 620 that receives the projection data from the medical imaging device. The processor 620 may have software running on it that is capable of executing the method 100 of the present invention. The software processes the projection data from the medical imaging device 610 and outputs an adaptively smoothed, SNR-equalized image.

The invention having been thus described, it will be apparent to those skilled in the art that the same may be varied in many ways without departing from the spirit and scope of the invention. Any and all such variations are intended to be included within the scope of the following claims.

What is claimed is:

1. A method performed by a processor for spatially localized noise-adaptive smoothing of nuclear medicine tomographic images, comprising:

obtaining a mean value $R_\alpha^{ij}$ for each pixel (i,j) of a reconstructed image by reconstructing a corresponding nuclear medicine data using a shift-invariant smoothing kernel of width $\alpha$;

obtaining a variance $V_\alpha^{ij}$ of each $R_\alpha^{ij}$;

forming a signal-to-noise ratio image $SNR_\alpha^{ij}$ from a ratio $$SNR_\alpha^{ij} = R_\alpha^{ij} / \sqrt{V_\alpha^{ij}};$$

(a) reconstructing all $R_\alpha^{ij}$ and $V_\alpha^{ij}$ for two or more different values of $\alpha$ within an interval $\alpha_{min} \leq \alpha \leq \alpha_{max}$;

(b) forming an SNR image, $SNR_\alpha^{ij}$, for each $R_\alpha^{ij}$ and $V_\alpha^{ij}$;

(c) selecting a target value for the SNR of the output image; and (d) determining a value of $R_\alpha^{ij}$ corresponding to the target value of SNR by interpolating between the $R_\alpha^{ij}$ values whose corresponding $SNR_\alpha^{ij}$ values bracket the target SNR using a model of the variation of $R_\alpha^{ij}$ with $SNR_\alpha^{ij}$, wherein if the target value of SNR is not bracketed by computed $SNR_\alpha^{ij}$ values, the $R_\alpha^{ij}$ value corresponding to the target SNR is the one whose corresponding value of $SNR_\alpha^{ij}$ is closest to the target SNR value.

2. The method of claim 1, wherein said step (a) reconstructing $R_\alpha^{ij}$ and $V_\alpha^{ij}$ for two or more different values of $\alpha$ further comprises:

$$R_\alpha^{ij} = \sum_{lm} h_\alpha(l - i\cos\theta_m + j\sin\theta_m) a_{lm} n_{lm}(p_{lm} - d_{lm} - s_{lm}),$$

wherein:

l and m are respectively the radial and angular sinogram bin indices;

$\theta_m$ is the projection angle;

a and n are respectively the attenuation correction and normalization factors;

p, d and s are respectively the prompt, randoms, and scattered coincidence data;

$h_\alpha(l)$ is the discrete filtering kernel wherein:

$$h_\alpha(l) = \sum_k C_k^l g_\alpha(k),$$

wherein:

$C_k^l$ is the standard filtered back-projection kernel corresponding to a ramp filter;

k is a radial bin index; and $g_\alpha(k)$ is a smoothing kernel of width $\alpha$; and $$V_\alpha^{ij} = \sum_{lm} h_\alpha^2(l - i\cos\theta_m + j\sin\theta_m) a_{lm}^2 n_{lm}^2 (p_{lm} + \gamma d_{lm}),$$

wherein $\gamma$ is a number between 0 and 1, with $\gamma = 0$ for noise-free randoms correction and $\gamma=1$ for delayed coincidence subtraction.

3. The method of claim 2 wherein said smoothing kernel $g_\alpha(k)$ is a Gaussian of width $\alpha$, $$g_\alpha(k) = \frac{1}{\sqrt{2\pi}\,\sigma} \exp\left(-\frac{k^2}{2\sigma^2}\right)$$

whose spatial full width at half maximum is
$\alpha = \sqrt{2\sigma^2(4\ln 2)}$.

4. The method of claim 1, further comprising:

(e) using the interpolated values of $R_\alpha^{ij}$ to form an SNR-equalized image, $R_{eq}^{ij}$, wherein $SNR_\alpha^{ij}$ is approximately the same for an appreciable set of pixels.

5. The method of claim 1, wherein the tomographic image is a PET image.

6. The method of claim 1, wherein the model of step (d) is a linear model.

7. The method of claim 1, wherein step (d) further comprises interpolating kernel widths to give the effective FWHM resolution at each point, $\alpha_{ij}$.

8. The method of claim 1, further comprising:

(e) using the selected value for the SNR as a threshold;

(f) reconstructing $R_\alpha^{ij}$, $V_\alpha^{ij}$ and $SNR_\alpha^{ij}$ images using a particular default value of $\alpha$;

(g) selecting the set of pixels in these images for which the value of $SNR_\alpha^{ij}$ is less than the target SNR value; and (h) substituting the said value of $R_\alpha^{ij}$ corresponding to the target value of SNR for each pixel in said set.

9. The method of claim 8, wherein the tomographic image is a PET image.

10. The method of claim 8, wherein the model of step (d) is a linear model.

11. The method of claim 8, wherein step (d) further comprises interpolating kernel widths to give the effective FWHM resolution at each point, $\alpha_{ij}$.

12. A system for producing spatially localized noise-adaptive smoothing of nuclear medicine tomographic images, comprising:

a nuclear medicine tomographic imaging device;

a processor for receiving data from the image device; and software executing on the processor, which obtains a mean value $R_\alpha^{ij}$ for each pixel (i,j) of a reconstructed image by reconstructing a corresponding nuclear medicine data using a shift-invariant smoothing kernel of width $\alpha$;

obtains a variance $V_\alpha^{ij}$ of each $R_\alpha^{ij}$; and forms a signal-to-noise ratio image $SNR_\alpha^{ij}$ from a ratio $$SNR_\alpha^{ij} = \frac{R_\alpha^{ij}}{\sqrt{V_\alpha^{ij}}}.$$

wherein said software reconstructs $R_\alpha^{ij}$ and $V_\alpha^{ij}$ for two or more different values of $\alpha$ within an interval $\alpha_{min} \leq \alpha \leq \alpha_{max}$, forms a signal-to-noise ratio (SNR) image, $SNR_\alpha^{ij}$ for each $R_\alpha^{ij}$ and $V_\alpha^{ij}$, selects a target value for the SNR of the output image, and determines a value of $R_\alpha^{ij}$ corresponding to the target value of SNR by interpolating between the $R_\alpha^{ij}$ values whose corresponding $SNR_\alpha^{ij}$ values bracket the target SNR using a model of the variation of $R^{\alpha ij}$, with $SNR_\alpha^{ij}$, wherein if the target value of SNR is not bracketed by computed $SNR_\alpha^{ij}$ values, the $R^{ij}$ value corresponding to the target SNR is the one whose corresponding value of $SNR_\alpha^{ij}$ is closest to the target SNR value.

13. The system of claim 12, wherein:

$$R_\alpha^{ij} = \sum_{lm} h_\alpha(l - i\cos\theta_m + j\sin\theta_m) a_{lm} n_{lm}(p_{lm} - d_{lm} - s_{lm}),$$

wherein:

l and m are respectively the radial and angular sinogram bin indices;

$\theta_m$ is the projection angle;

a and n are respectively the attenuation correction and normalization factors;

p, d and s are respectively the prompt, randoms, and scattered coincidence data;

$h_\alpha(l)$ is the discrete filtering kernel wherein:

$$h_\alpha(l) = \sum_k C_k^l g_\alpha(k),$$

wherein:
$C_k^l$ is the standard filtered back-projection kernel corresponding to a ramp filter;
k is a radial bin index; and
$g_\alpha(k)$ is a smoothing kernel of width $\alpha$; and $$V_\alpha^{ij} = \sum_{lm} h_\alpha^2(l - i\cos\theta_m + j\sin\theta_m) a_{lm}^2 n_{lm}^2 (p_{lm} + \gamma d_{lm}),$$

wherein $\gamma$ is a number between 0 and 1, with $\gamma=0$ for noise-free randoms correction and $\gamma=1$ for delayed coincidence subtraction.

14. The system of claim 13 wherein said smoothing kernel $g_\alpha(k)$ is a Gaussian of width $\alpha$, $$g_\alpha(k) = \frac{1}{\sqrt{2\pi}\,\sigma} \exp\left(-\frac{k^2}{2\sigma^2}\right)$$

whose spatial full width at half maximum is $$\alpha = \sqrt{2\sigma^2(4\ln 2)}.$$

15. The system of claim 12, wherein the software uses the interpolated values of $R_\alpha^{ij}$ to form an SNR-equalized image, $R_{eq}^{ij}$, wherein $SNR_\alpha^{ij}$ is approximately the same for an appreciable set of pixels.

16. The system of claim 12, wherein the imaging device is a PET scanner.

17. The system of claim 12, wherein the interpolation model used by the software is a linear model.

18. The system of claim 12, wherein the software interpolates kernel widths to give the effective FWHM resolution at each point, $\alpha_{ij}$.

19. The system of claim 12, wherein the software uses the selected value for the SNR as a threshold; reconstructs $R_\alpha^{ij}$, $V_\alpha^{ij}$ and $SNR_\alpha^{ij}$ images using a particular default value of $\alpha$; selects the set of pixels in these images for which the value of $SNR_\alpha^{ij}$ is less than the target SNR value; and substitutes the said value of $R_\alpha^{ij}$ corresponding to the target value of SNR for each pixel in said set.

20. The system of claim 19, wherein the software interpolates kernel widths to give the effective FWHM resolution at each point, $\alpha_{ij}$.

* * * * *